US010009301B1

(12) United States Patent
Cheng et al.

(10) Patent No.: US 10,009,301 B1
(45) Date of Patent: Jun. 26, 2018

(54) PEER-TO-PEER LOCATION-BASED MESSAGING

(71) Applicant: Spearhead, Inc., Bear, DE (US)

(72) Inventors: Kit Ning Cheng, Brooklyn, NY (US); Simon Kandial, Ozone Park, NY (US); Harjeet Singh, Bear, DE (US)

(73) Assignee: Spearhead Inc., Bear, DE (US)

( * ) Notice: Subject to any disclaimer, the term of this patent is extended or adjusted under 35 U.S.C. 154(b) by 0 days. days.

(21) Appl. No.: 15/860,052

(22) Filed: Jan. 2, 2018

(51) Int. Cl.
| *H04W 24/00* | (2009.01) |
| *H04L 12/58* | (2006.01) |
| *H04W 4/02* | (2018.01) |
| *H04W 4/12* | (2009.01) |
| *H04M 1/725* | (2006.01) |
| *H04L 29/08* | (2006.01) |
| *G06Q 30/02* | (2012.01) |
| *G06Q 50/16* | (2012.01) |

(52) U.S. Cl.
CPC ......... *H04L 51/12* (2013.01); *G06Q 30/0252* (2013.01); *G06Q 30/0255* (2013.01); *H04L 67/1068* (2013.01); *H04M 1/72552* (2013.01); *H04M 1/72572* (2013.01); *H04W 4/023* (2013.01); *H04W 4/12* (2013.01); *G06Q 50/16* (2013.01); *H04W 24/00* (2013.01)

(58) Field of Classification Search
CPC . H04L 51/12; H04L 67/1068; G06Q 30/0252; G06Q 30/0255; G06Q 50/16; H04M 1/72552; H04M 1/72572; H04W 4/023; H04W 4/12; H04W 24/00
USPC ....................................................... 455/456.3
See application file for complete search history.

(56) References Cited

U.S. PATENT DOCUMENTS

| 5,987,606 A | 11/1999 | Cirasole et al. |
| 6,101,480 A | 8/2000 | Conmy et al. |
| 6,681,107 B2 | 1/2004 | Jenkins et al. |
| (Continued) | | |

OTHER PUBLICATIONS

'academy.pulsatehq.com' [online] Leddy., "10 things about Bluetooth beacons you need to know," Available on or before Jul. 24, 2015, via Internet Archive: Wayback Machine URL <https://web.archive.org/web/20150728025046/http://academy.pulsatehq.com/bluetooth-beacons>, [Retrieved Feb. 7, 2018], Retrieved from: URL <http://academy.pulsatehq.com/bluetooth-beacons>, 6 pages.

(Continued)

*Primary Examiner* — Mong-Thuy Tran
(74) *Attorney, Agent, or Firm* — Fish & Richardson P.C.

(57) ABSTRACT

Methods, systems, and apparatus, including computer programs stored on a computer-readable storage medium, for peer-to-peer location-based messaging. In some implementations, a mobile device selectively displays displayable messages associated with beacons corresponding to specific locations that the mobile device visits. The mobile device can extract identifiers from wireless messages from beacons and determine whether to display a message corresponding to a beacon based on filter parameters of a user and data indicating characteristics of a property where a beacon is located. The displayable messages corresponding to beacons can be messages users who associated with the beacons have previously designated for presentation upon detection of the beacons. The mobile device can displays the displayable message for a beacon while the mobile device is a detection range to receive the wireless message from the beacon.

18 Claims, 7 Drawing Sheets

(56) References Cited

U.S. PATENT DOCUMENTS

| | | | |
|---|---|---|---|
| 8,244,566 | B1 | 8/2012 | Coley et al. |
| 8,866,673 | B2* | 10/2014 | Mendelson .......... G01C 21/206 |
| | | | 342/386 |
| 9,204,257 | B1* | 12/2015 | Mendelson .............. G08G 1/14 |
| 9,538,332 | B1* | 1/2017 | Mendelson .............. H04W 4/90 |
| 9,565,528 | B2* | 2/2017 | Chan ..................... H04W 4/025 |
| 9,674,684 | B1* | 6/2017 | Mendelson ............. H04W 4/90 |
| 2002/0035493 | A1 | 3/2002 | Mozayeny et al. |
| 2008/0109761 | A1 | 5/2008 | Stambaugh |
| 2009/0106036 | A1 | 4/2009 | Tamura et al. |
| 2009/0158173 | A1 | 6/2009 | Palahnuk et al. |
| 2012/0284637 | A1 | 11/2012 | Boyer et al. |
| 2014/0335897 | A1* | 11/2014 | Clem .................... G08G 1/0112 |
| | | | 455/456.3 |
| 2014/0358685 | A1* | 12/2014 | Want ................... G06Q 30/0261 |
| | | | 705/14.58 |
| 2015/0140982 | A1* | 5/2015 | Postrel .................... H04W 4/12 |
| | | | 455/418 |
| 2015/0163765 | A1* | 6/2015 | Hobbs ..................... H04W 4/21 |
| | | | 455/41.2 |
| 2015/0350820 | A1* | 12/2015 | Son ....................... H04W 12/08 |
| | | | 455/41.2 |
| 2016/0029155 | A1* | 1/2016 | Kerr ........................ H04W 4/02 |
| | | | 455/456.3 |
| 2016/0034996 | A1* | 2/2016 | Min .................... G06Q 30/0623 |
| | | | 705/26.61 |
| 2016/0086029 | A1* | 3/2016 | Dubuque ........... G06K 9/00536 |
| | | | 382/159 |
| 2016/0162938 | A1* | 6/2016 | LeBeau .............. G06Q 30/0255 |
| | | | 705/14.53 |
| 2016/0180621 | A1* | 6/2016 | Desinor, Jr. ........ G07C 9/00896 |
| | | | 340/5.61 |
| 2016/0321702 | A1* | 11/2016 | Lerman .............. G06Q 30/0267 |
| 2018/0063684 | A1 | 3/2018 | Cheng et al. |

OTHER PUBLICATIONS

'atlassian.com' [online] "Saving your search as a filter," Available on or before Aug. 16, 2016, [Retrieved Feb. 6, 2018], Retrieved URL <https://confluence.atlassian.com/jiracoreserver072/saving-your-search-as-a-filter-829092676.html>, 7 pages.

'beaconsage.com' [online] Thomas, "3 Reasons Beacons Are Great for Real Estate," Nov. 2, 2016 [Retrieved Aug. 30, 2017], Retrieved URL <https://www.beaconsage.com/blog/3-reasons-beacons-are-great-for-real-estate/>, 5 pages.

'beaconsage.com' [online] Thomas, "Real Estate and the Internet of Things," Sep. 29, 2016. [Retrieved Aug. 30, 2017], Retrieved URL <https://www.beaconsage.com/blog/real-estate-and-the-internet-of-things/>, 6 pages.

'beaconsagere.com' [online] "Show Your Property Listings to More People," Available on or before Dec. 31, 2017, Retrieved Feb. 5, 2018, Retrieved URL <http://www.beaconsagere.com/>, 2 pages.

'beaconstac' [online] Babu., "10 Interesting Ways to Send Beacon-based Proximity Marketing Messages to Customers," Mar. 31, 2016, Retrieved Feb. 6, 2018, Retrieved URL <https://blog.beaconstac.com/2016/03/10-interesting-ways-to-send-beacon-based-proximity-marketing-messages-to-customers/>, 8 pages.

'beaconstac.com' [online] Girish., "How Beacons can help Transform Visitor Experience at Zoos and Theme Parks," Sep. 16, 2014, Retrieved Feb. 6, 2018, Retrieved URL <https://blog.beaconstac.com/2014/09/how-beacons-can-help-transform-visitor-experience-at-zoos-and-theme-parks/>, 6 pages.

'beaconstac.com' [online] Mittal., "Retail 2016: Why Retailers should use Beacons to Target Millennials," Apr. 27, 2016, Retrieved Feb. 6, 2018, Retrieved URL <https://blog.beaconstac.com/2016/04/retail-2016-how-retailers-can-use-beacons-to-target-millennials/>, 8 pages.

'chicagorealtor.com' [online] Wolf., "Geotargeting: The Newest Adage in Real Estate Marketing," Dec. 16, 2016, Retrieved Feb. 5, 2018, Retrieved URL <https://chicagorealtor.com/geotargeting-newest-adage-real-estate-marketing/>, 2 pages.

'eznetscheduler' [online] "Real estate appointment scheduler," Available on or before Jun. 4, 2017, via Internet Archive: Wayback Machine URL <https://web.archive.org/web/20170604213638/http://www.eznetscheduler.com/content/realestate/>, [Retrieved Feb. 7, 2018], Retrieved URL <http://www.eznetscheduler.com/content/realestate/>, 5 pages.

'mowowstudios.com' [online] "Over 100 use cases and examples for iBeacon technology," Available on or before Jul. 24, 2017, via Internet Archive: Wayback Machine URL <https://web.archive.org/web/20170724091109/http:/blog.mowowstudios.com/2015/02/100-use-cases-examples-ibeacon-technology/>, [retrieved on Feb. 6, 2018], retrieved from: URL <http://blog.mowowstudios.com/2015/02/100-use-cases-examples-ibeacon-technology/>, 6 pages.

'openhomepro' [online] "Collect and convert more leads," Available on or before Feb. 2, 2011, via Internet Archive: Wayback Machine URL <https://web.archive.org/web/20110202043917/https://www.openhomepro.com/>, [Retrieved Feb. 7, 2018], Retrieved URL <https://www.openhomepro.com/>, 1 page.

'realtormag.realtor.org' [online] Davenport., "Under the sells-scope: spacio," Apr. 2016, Retrieved Feb. 6, 2018, Retrieved URL <http://realtormag.realtor.org/for-brokers/network/article/2016/04/under-sells-scope-spacio>, 3 pages.

'redfin.com' [online] "How do you save a search?," Mar. 26, 2013 [Retrieved Feb. 6, 2018], Retrieved URL <https://support.redfin.com/hc/en-us/community/posts/205876556-How-do-you-save-a-search->, 10 pages.

'remax.com' [online] "RE/MAX mobile app," Available on or before Apr. 20, 2016, via Internet Archive: Wayback Machine URL <https://web.archive.org/web/20160420090709/https://www.remax.com/general/mobile-apps/>, [Retrieved Feb. 7, 2018], Retrieved URL <https://www.remax.com/general/mobile-apps/>, 2 pages.

'showings.com' [online] Phelan., "5 Ways Showing Management Boosts Agent Productivity and Home Sales," May 8, 2017 [Retrieved Feb. 6, 2018], Retrieved URL <https://www.showings.com/News/2017/05/08/5-Ways-Showing-Management-Boosts-Agent-Productivity-and-Home-Sales>, 6 pages.

'showingsuite.com' [online] "Automated Showing Schedule," Available on or before Jan. 9, 2016, via Internet Archive: Wayback Machine URL <https://web.archive.org/web/20160109232006/http://www.showingsuite.com/features/automated-showing-scheduling/>, [Retrieved Feb. 7, 2018], Retrieved URL <http://www.showingsuite.com/features/automated-showing-scheduling/>, 3 pages.

'showingsuite.com' [online] "Showing Suite," Available on or before Mar. 28, 2009, via Internet Archive: Wayback Machine URL <https://web.archive.org/web/20090328134149/http://www.showingsuite.com>, [Retrieved Feb. 7, 2018], Retrieved URL <http://www.showingsuite.com/>, 2 pages.

'showingtime.com' [online] "Showings," Available on or before Jun. 10, 2016, via Internet Archive: Wayback Machine URL <https://web.archive.org/web/20160610110832/http://www.showingtime.com/showings>, [Retrieved Feb. 7, 2018], Retrieved URL <http://www.showingtime.com/showings>, 5 pages.

'softwebsolutions.com' [online] "Beacon-based contextual marketing opportunities in the real estate industry," Nov. 24, 2015, Retrieved Aug. 30, 2017, Retrieved URL <http://www.softwebsolutions.com/resources/beacon-contextual-marketing-in-real-estate-industry.html>, 8 pages.

'spac.io' [online] "The paperless open house," Available on or before Sep. 22, 2014, via Internet Archive: Wayback Machine URL <https://web.archive.org/web/20140922104434/http://spac.io.>, [Retrieved Feb. 6, 2018], Retrieved URL <http://spac.io/>, 2 pages.

* cited by examiner

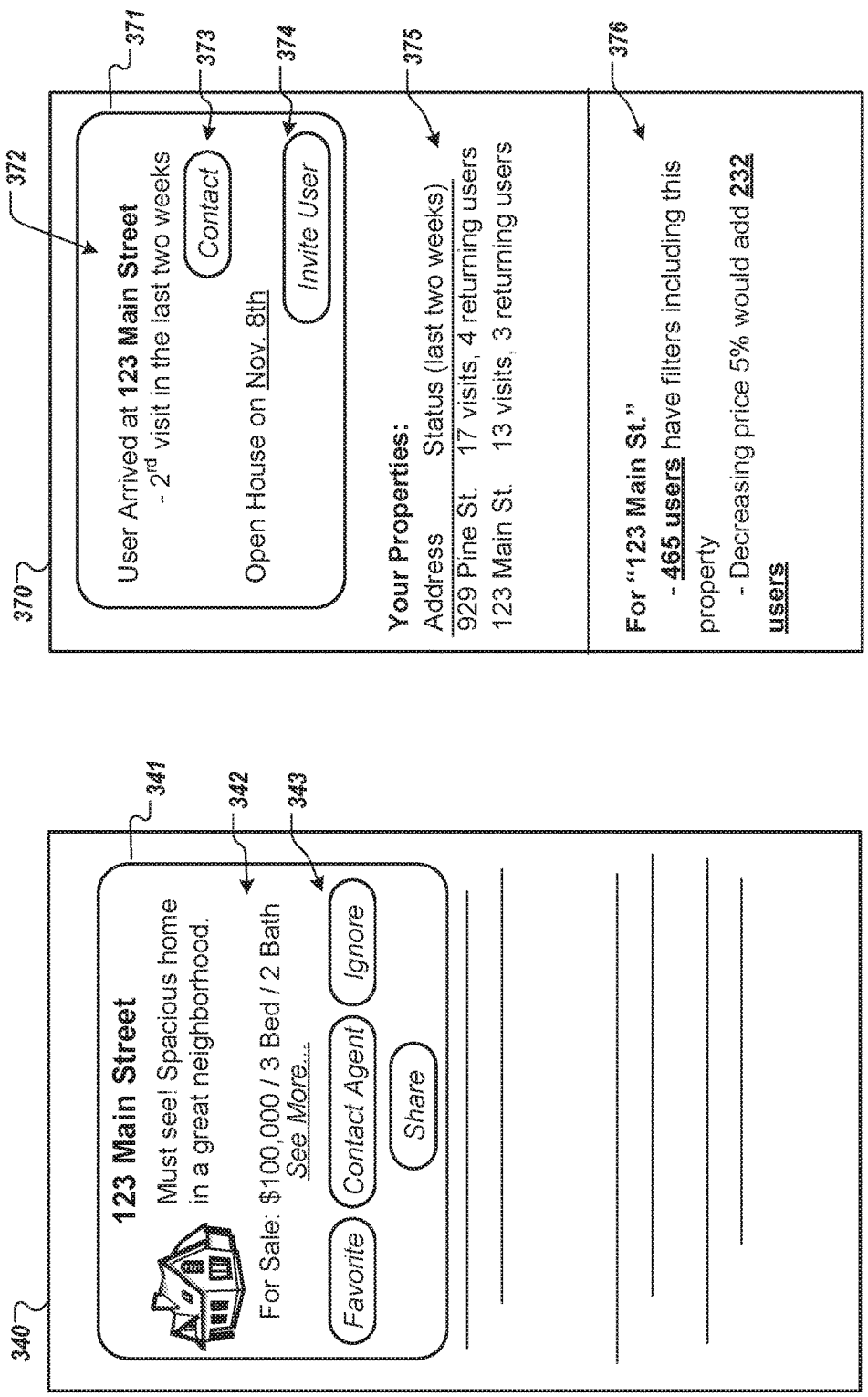

PEER-TO-PEER LOCATION-BASED MESSAGING

TECHNICAL FIELD

This document generally relates to peer-to-peer location-based messaging.

BACKGROUND

Short-range wireless communication protocols, such as Wi-Fi and Bluetooth, allow messages to be provided to devices located near a transmitter.

SUMMARY

In some implementations, a system enables users to register wireless beacons with specific locations and set displayable messages to be provided to other users when the beacons are detected. The system can selectively provide messages to mobile devices of users, to describe the locations where the beacons are located. In addition, each user of the system can set personalized criteria that indicate characteristics of locations that are of interest to the user. Based on the personalized criteria, the system may selectively presents messages to the user's mobile device when messages from beacons are detected. As a result, the mobile devices of users do not necessarily provide notifications for every beacon detected, and users may have control over the types of locations they are notified about.

The selective presentation of notifications by a device, based on filter parameters in the user's control, provides a number of advantages. For example, the technique can ensure efficient use of computing resources, since a user's mobile device does not unnecessarily consume battery power or network bandwidth obtaining and providing messages that are not useful to the user. At the same time, the system allows users to discover new locations and automatically receive information describing the locations when near, without being overwhelmed or distracted by messages describing locations that are not relevant. The decision making regarding the messages to display can be performed at a mobile device, at a server system, or a combination of both. For example, a mobile device may store and apply a user's filter settings to limit messages provided to those that satisfy the filter settings. In addition, or as an alternative, the mobile device can provide the filter settings to a server system, which can store and apply the filter settings. Rather than send many messages to the mobile device over a network and require the mobile device to assess relevance, the server system can pre-filter the messages so that only messages for appropriate locations are sent. Thus, the server system can reduce the need for the mobile device to receive and process messages that would not be relevant to a user.

Besides providing messages at mobile devices that detect beacons, the system provides real-time information to users that manage the beacons. When a user arrives at a location and his mobile device detects the beacon, the system can notify the user that registered the beacon. In particular, the system can indicate whether the visiting user has filter criteria that are satisfied by the property, and even provide controls to initiate communication with the user. Even without any communication between the beacons and the server system, the server system can identify and aggregate information about current locations of users relative to the beacons, then notify users of the presence of other users near the beacons.

The system selectively notifies users who register beacons about visits by others, similar to the way users are selectively notified about beacons at locations they visit. For example, a user that registers a beacon may be notified when users visit the beacon, but only when the visiting users have set filter parameters that are satisfied by the characteristics of the location of the beacon. Similarly, a user that places a beacon may select to be notified when a user makes a second or subsequent visit to a location, when the user's visit has at least a minimum duration, or when other conditions are satisfied.

As discussed further below, the architecture of the platform enables robust tracking and communication based on beacon detection even with simple beacon devices. For example, beacons may simply transmit a short, low-power message including an identifier for the beacon. The wireless message from the beacon generally does not include content to be displayed on a mobile device. Instead, the beacon simply provides an identifier which the mobile device can use to obtain appropriate content from a server system over a different communication channel, e.g., a communication network such as the Internet. In fact, the beacon may be a small transmit-only device and need not receive or process any information from a visiting mobile device or the server system. Even though the beacon does not receive and process communications or provide messages for display, the detection of the wireless message may nevertheless trigger the display of a rich set of content. For example, a mobile device can provide the identifier to the server system, which can provide a displayable message corresponding to the beacon to the mobile device for display.

The server system can also provide a registration interface that allows an authorized user to specify the location and message associated with each individual beacon. Due to the architecture of the platform, the user can change the message to be provided in response to detection of a beacon rapidly and remotely, for example, through an application or web page. The location registered for a beacon can also be changed through the registration interface, allowing the beacon to be used at different locations. These changes to the location and message designated for the beacon can be made without any change to the wireless message the beacon transmits.

The arrangement of the system described in this document addresses a number of problems with prior messaging techniques. In many prior systems, changing beacon messages and the resulting displays to users is difficult and often does not allow up-to-date content at different locations. Users often are not able to provide messages customized for relevance to other users at specific locations. Additionally, users previously did not have opportunities to initiate direct communication with specific users that are currently located at, or previously visited, a specific location. Some prior beacon systems required communication with each individual beacon, often through direct communication or physical access, in order to change the content provided to a user nearby. Even if messages shown to users can be changed, the process often requires a user to specify new computer code or involves significant delays for the changes to take effect. In some instances, beacon devices have been hacked by malicious users to provide altered transmissions contrary to what the owner intended. In addition, the task of managing beacons can be burdensome, especially across multiple locations and where locations include multiple beacons. These challenges and the costs of maintaining a messaging system have discouraged many locations from deploying beacon-based messaging. Further, typical beacon based systems do not allow for users of a platform to specify messages to be provided to other users of the platform when reach specific locations.

The arrangement of the system, the mobile application, and the beacon management interfaces can provide one or more of the following advantages. For example, users have the flexibility to change their messages quickly and remotely, without needing any physical access or change to the beacon device itself. Using a web page or an application, a user can change which content to provide for specific beacons, and the server system can make the changes effective in seconds or less. Users benefit from customized, fine-grained control to specify the behavior of each of multiple beacons from a single application or website. A user can make changes to the messages and content to be provided to others without programming any computer code.

Along with the flexibility to easily specify and customize user experiences, the security of the location-based messaging system is enhanced. After initial set up, a beacon device can be securely locked to block malicious changes to the beacon transmissions. The beacon device can be a simple wireless transmitter, and may not include a wireless receiver in some implementations, which also enhances security and maintains a low cost. Installation, management, and maintenance of the beacons is thus easily managed and the system can easily adapt to distributed changes to the locations of beacons initiated by independent third parties (e.g., agent users discussed below) and changes in the messages provided in response to detecting beacons.

In one general aspect, a method performed by a mobile device includes: providing, by the mobile device, a user interface of an application, the user interface comprising interactive filter elements configured to receive user input specifying characteristics of properties; receiving, by the mobile device, user input that specifies filter parameters for one or more of the interactive filter elements; sending, by the mobile device, the filter parameters to a server system in association with user identification data that identifies a user of the mobile device; detecting, by the mobile device, a plurality of beacons by receiving a wireless message from each of the beacons, each of the wireless messages including an identifier for the beacon that transmitted the wireless message, each of the beacons corresponding to a different property and being located at the corresponding property; extracting, by the mobile device, the identifiers for the beacons from the wireless messages; transmitting, by the mobile device, the extracted identifiers for the beacons to the server system; receiving, by the mobile device, displayable messages from the server system for at least some of the extracted identifiers; and selectively displaying, by the mobile device, displayable messages associated with the extracted identifiers based on the filter parameters and data indicating characteristics of the properties where the beacons are located, where, for each of the displayable messages, the mobile device displays the displayable message while the mobile device is in a detection range to receive the wireless message from the beacon corresponding to the displayable message.

In some implementations, each of the displayable messages is a message that another user who is associated with the beacon previously designated for presentation upon detection of the beacon.

In some implementations, the method includes, for each of the displayable messages, receiving the displayable message from the server system over a communications network in response to transmitting the extracted identifier for the beacon corresponding to the displayable message. Each of the displayable messages describes characteristics of the property corresponding to the beacon.

In some implementations, extracting the identifiers includes extracting an identifier from the wireless message from each of the beacons in the plurality of beacons. Transmitting the extracted identifiers includes transmitting the extracted identifiers for each of the beacons in the plurality of beacons. Selectively displaying the displayable messages includes (i) displaying a displayable message for only a subset of the beacons detected by the mobile device, each of the beacons in the subset being associated with a displayable message describing characteristics that satisfy the one or more filter parameters, and (ii) not displaying a message for one or more beacons detected by the mobile device that are associated with a displayable message that describing characteristics that do not satisfy the one or more filter parameters.

In some implementations, the method includes receiving, by the mobile device and from the server system, a different displayable message for each of the beacons in the set of beacons, each of the different displayable messaged describing characteristics of the property corresponding to the beacon; and evaluating, by the mobile device, each of the different displayable messages to determine whether the displayable message describes characteristics that satisfy the filter parameters. Selectively displaying the displayable messages includes displaying only the displayable messages that the mobile device determined to describe characteristics that satisfy the filter parameters.

In some implementations, the method includes receiving, by the mobile device, pre-filtered messages from the server system, the pre-filtered messages including a different displayable message for each of the beacons in the subset, and the pre-filtered messages excluding displayable messages for beacons that were detected by the mobile device but have corresponding displayable messages that do not describe characteristics that satisfy the filter parameters.

In some implementations, detecting, by the mobile device, a plurality of beacons by receiving a wireless message from each of the beacons includes receiving the wireless messages over a Bluetooth wireless interface.

In some implementations, detecting, by the mobile device, a plurality of beacons by receiving a wireless message from each of the beacons includes: determining a signal strength at which a particular message is received; determining that the signal strength satisfies a threshold; and designating the particular beacon as detected in response to determining that the signal strength satisfies the threshold.

In some implementations, the interactive filter elements are configured to receive user input specifying characteristics that represent physical features of properties.

In some implementations, the method includes receiving, from the server system, an additional message that identifies a property corresponding to a beacon that the mobile device did not detect, the additional message being provided based on the filter parameters sent by the mobile device; and displaying the additional message on a display of the mobile device.

In another general aspect, a method performed by a server system includes: providing, by the server system, a registration interface for registering individual beacons with a respective property and a respective message to be provided upon detection of the beacon; receiving, by the server system, registration data provided through the interface by a user associated with a particular beacon, the registration data specifying a property corresponding to the particular beacon and a message corresponding to the particular beacon, where the message describes characteristics of the property; in response to receiving the registration data, assigning, by the server system, the message indicated by the registration data for presentation to mobile devices that detect a wireless message transmitted by the beacon; storing, by the server system, the message in association with an identifier for the particular beacon; receiving, by the server system, a message from a mobile device, the message indicating the identifier for the particular beacon; and in response to receiving the message indicating the identifier for the particular beacon, sending, by the server system and to the mobile device, the message corresponding to the particular beacon for display while the mobile device is in a geographic range to receive the wireless message transmitted by the particular beacon.

In some implementations, the method includes receiving, from the mobile device, filter parameters entered to the mobile device and a user identifier for a user of the mobile device; and storing the filter parameters in association with the user identifier.

In some implementations, the method includes receiving, from the mobile device, filter parameters entered to the mobile device and a user identifier for a user of the mobile device. Receiving the message indicating the identifier for the particular beacon includes receiving the identifier for the particular beacon in association with the user identifier for the user of the mobile device. The method further includes, in response to receiving the message from the mobile device, determining that characteristics of the property associated with the particular beacon satisfy the filter parameters for the user of the mobile device. Sending the message corresponding to the particular beacon is performed based on determining that characteristics of the property associated with the particular beacon satisfy the filter parameters for the user of the mobile device.

In some implementations, the method includes receiving, by the server system, sets of filter parameters from each of multiple different mobile devices; storing, by the server system, the sets of filter parameters in association with user identifiers for users of the multiple different mobile devices; receiving, by the server system, data for each of the multiple different mobile devices indicating identifiers of beacons detected by the mobile device; identifying, by the server system, one or more properties corresponding to wireless beacons associated with a particular agent user; identifying, by the server system, users whose filter parameters are satisfied by at least one of the one or more properties and who are currently located in a geographic area that includes the one or more properties; and providing, by the server system and to an electronic device associated with the particular agent user, information that describes the identified users.

In some implementations, providing the information to the agent user includes: indicating a count of the identified users; indicating a count of the identified users whose filter parameters are satisfied by a particular one of the one or more properties; indicating a specific user of the identified users who is currently located at a particular property of the one or more properties and whose filter parameters are satisfied by the particular property; providing an indication of filter parameters of one or more of the identified users or an aggregate measure of filter parameters for multiple of the identified users; or indicating, for one or more of the identified users, a number of visits to at least one of the one or more properties or a duration of visits to at least one of the one or more properties.

In some implementations, the method includes providing, to the electronic device associated with the particular agent user, data causing the electronic device to provide a user interface enabling the particular agent user to initiate communication with one or more of the identified users; receiving, from the electronic device, user interaction data indicating interaction with the user interface; and in response to the interaction data, initiating communication between the particular agent user and one or more of the identified users.

In some implementations, the method includes, in response to receiving the message from the mobile device indicating the identifier for the particular beacon, determining that the filter parameters for a first user associated with the mobile device are satisfied by the characteristics of the property corresponding to the particular beacon; identifying an agent user associated with the particular beacon; and providing a notification to an electronic device of the identified agent user while the mobile device of the first user is located to detect the wireless message from the particular beacon.

In some implementations, the method includes, in response to receiving the message from the mobile device indicating the identifier for the particular beacon: accessing data indicating previous visits to properties by the user of the mobile device, the previous visits being determined based on detection of identifiers for beacons corresponding to the properties; and providing data describing the previous visits to an agent user associated with the particular beacon.

In some implementations, the method includes, receiving, by the server system, filter parameters from each of multiple different mobile devices; storing, by the server system, the filter parameters in association with user identifiers for users of the multiple different mobile devices; identifying an event scheduled to be held at a particular property; selecting a set of users to invite to the event based on the stored filter parameters; and providing, to each of the selected users, an invitation to the event.

In some implementations, the method includes: identifying, based on data indicating beacon identifiers provided by mobile devices, users that have visited a particular property within a particular period of time; and causing an invitation to an event to be provided to each of the identified users for which the particular property satisfies the filter criteria for the user.

In some implementations, the method includes: determining an identifier for the property corresponding to the particular beacon; and using the determined identifier to obtain, from a third-party server, data describing characteristics of the property corresponding to the particular beacon. Sending the message corresponding to the particular beacon includes sending a message indicating one or more of the characteristics of the property indicated by the obtained data.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the subject matter described in this specification are set forth in the accompanying drawings and the description below. Other

BRIEF DESCRIPTION OF THE DRAWINGS

FIGS. 2B, 2C, 3B, and 3C are diagrams that illustrate examples of user interfaces used for peer-to-peer location-based messaging.

Like reference numbers and designations in the various drawings indicate like elements.

DETAILED DESCRIPTION

Figure 1:
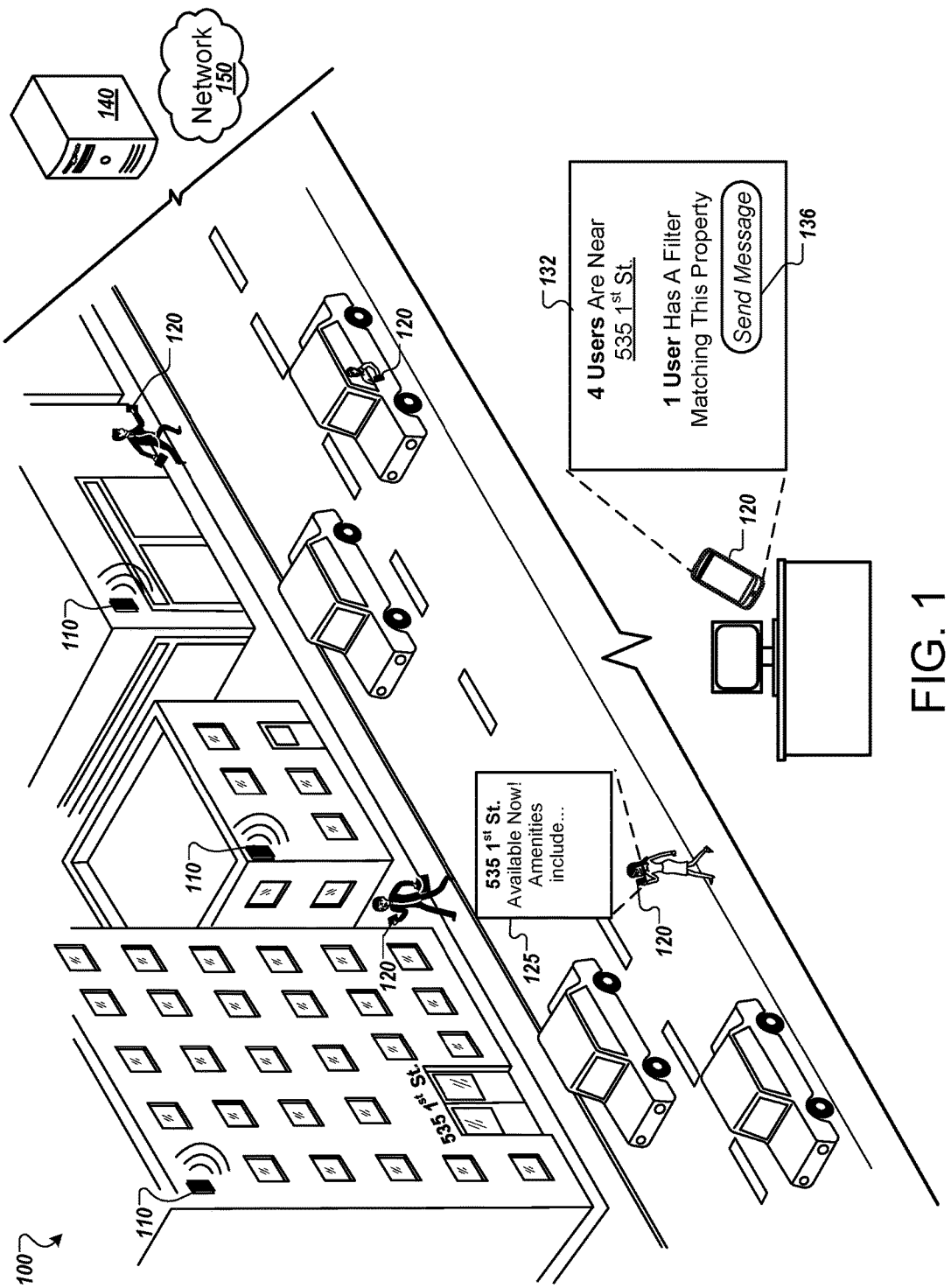
FIG. 1 is a diagram that illustrates an example of a system for peer-to-peer location-based messaging.

FIG. 1 shows an example of a system 100 for peer-to-peer location-based messaging. The system 100 includes wireless beacons 110, mobile devices 120, a server system 140, and a network 150. In general, the system 100 allows users to specify messages corresponding to the beacons 110. The system 100 causes the user-specified messages to be displayed on the mobile devices 120 of other users when they approach the beacons 110. Users receive messages about a location in real time, while located near the location. Users are not necessarily shown messages for every beacon 110 detected, however. The system 100 allows users to set filter parameters or other preferences for locations, and the system 100 can notify users regarding only the locations that meet the user's preferences.

When a mobile device 120 detects a beacon 110, the mobile device 120 selectively presents a message corresponding to the beacon 110, according to the relevance of the location of the beacon 110 to the user of the mobile device. If the location satisfies certain user-specified criteria, the mobile device 120 can provide a real-time notification to the user while the user is near the beacon 110. If the location does not satisfy the user-specified criteria, the mobile device 120 does not notify the user. The messages for the beacons 110 can each describe the location where the beacon 110 is located, such as a real estate property for sale or for rent. As a result, as a mobile device 120 travels and detects beacons 110, the mobile device 120 can notify the user of nearby properties of interest and provide descriptions of those properties, while not providing unnecessary notifications about properties that are not relevant to the user.

The users of the system 100 may have different roles or modes of using the system 100. Some users may be interested in discovering new real estate properties. For these users, an application on their mobile devices 120 can operate in a discovery mode to detect beacons 110 and display real-time messages in response. The users can also set filters to limit the types of properties that they will be notified about. Other users may determine where to place beacons 110 and what messages should be displayed when the beacons 110 are detected. For example, agent users (e.g., real estate brokers, real estate agents, property managers, property owners, etc.), referred to simply as "agents," can place beacons 110 at certain properties that are for rent or for sale.

Agent users of the system 110 can choose the locations for the beacons 110 and the messages provided when beacons 110 are detected. Each of the beacons 110 is associated with a user of the system 100. When an agent places a beacon 110 at a desired location, such as a real estate property, the agent can designate the current location of the beacon 110 using an application, web page, or other interface. The agent can also use the interface to specify a message to be presented on mobile devices 120 that arrive at the location and detect the beacon 110. The server system 140 stores the location information and message registered for each beacon 110, and provides the messages to mobile devices 120 over a network 150 when the mobile devices 120 detect the beacons 110.

In the system 100, each beacon 110 periodically sends a short message that includes a beacon identifier, but does not send the actual content to be displayed on the mobile devices 120. The server system 140 stores and manages the messages for mobile devices 120 to display when beacons 110 are detected. This arrangement provides a number of advantages. For example, it allows the beacons 110 to send very short, simple messages, which minimizes the power used by the beacons 110 and can allow a small battery-powered beacon to operate for months or years. Even though the wireless message from a beacon 110 is small, mobile devices 120 can still receive rich content from the server system 140 upon detection of the beacon 110. For example, text, images, video, maps, animations, controls to initiate communication, and other elements can be provided through interaction with the server system 140. Additionally, the size and cost of the beacons 110 is reduced, since the beacons do not require hardware or complexity to establish communication with a network. The beacons 110 can be simple, transmit-only devices, yet still trigger the presentation of media-rich notifications and interactive user experiences when detected by mobile devices 120.

The arrangement of the beacons 110, mobile devices 120, and server system 140 also increase the flexibility of the system 100, since users can change the messages presented upon detection of their beacons 110 remotely and at any time, through an interface with the server system 140 over the network 150. Beacons 110 can be easily re-used at different locations with no alteration to the beacon or the wireless message transmitted by the beacon 110. The agent associated with the beacon 110 can simply move the beacon 110 to a new location, then register the new location and new message with the server system 140.

The ability of the system 100 to store and apply user-specified filters can also provide a number of advantages. Users who are searching for real estate properties each have their own needs and preferences. Most users would be overwhelmed if provided a notification for every property they passed by. The system 100 uses filters to selectively provide notifications to users, which provides users the most relevant information and avoids inefficient use of computing resources. Users may set personalized filters to define the types of properties they are interested in. The filter settings are then used by mobile devices and by the server system 140 to notify users only for properties matching their personalized criteria. Not only does this provide an improved user experience, it can reduce the power usage, network bandwidth usage, and processing requirements of the mobile devices 120, as discussed further below.

The example of FIG. 1 shows various users and their mobile devices 120. Each of the users has optionally set filter parameters to indicate the types of properties that he or she would like to be notified about. A number of beacons 110 have been placed at different properties that are for sale or for lease. These properties could be homes, apartments, condominium units, commercial buildings, or other properties.

As the users pass by the properties where the beacons 110 are located, the mobile devices 120 detect wireless messages from the beacons 110. The mobile devices 120 interact with the server system 140 to obtain messages corresponding to the properties that satisfy the user's personal filter criteria. When a property has characteristics that satisfy a user's filter parameters, the mobile device 120 outputs a notification for the property to the user. An example is shown as user interface 125, which shows a notification that a mobile device 120 displays after detecting the beacon 110 located at an apartment with an address of "535 1st St." All four of the mobile devices 120 along the street detect a wireless message from the beacon 110, but three of the four have filter settings that exclude the property. As discussed below, the filter settings may specify preferences for property type, interior space (e.g. square footage), location, number of bedrooms, number of bathrooms, price, and other characteristics. The notification is provided automatically by the mobile device 120 of the user whose filter settings are satisfied by the property.

The system 100 can also use the detection of beacons 110 to provide real-time, location-based information to agents. When mobile devices 120 detect beacons 110, they send identifiers for the detected beacons to the server system 140. The server system 140 can use this information to determine which users are near a property, and provide information to the agent having a beacon 110 at the property. In the example of FIG. 1, the server system 140 causes a notification 132 to be displayed at the mobile device 120 of the agent user that manages the beacon 110 for the "535 1st St." property. The notification 132 indicates a number of users who are near the property, and a number of users near the property for whom the property satisfies the users' personal filter criteria. The notification 132 also provides a control 136, such as a button or link, that the agent can use to initiate communication with the user near the property. This notification 132 can help an agent know when people arrive at a property, and allow the agent to initiate communication at the time when visitors are nearby and information about the property is most useful to them.

Figure 2A:
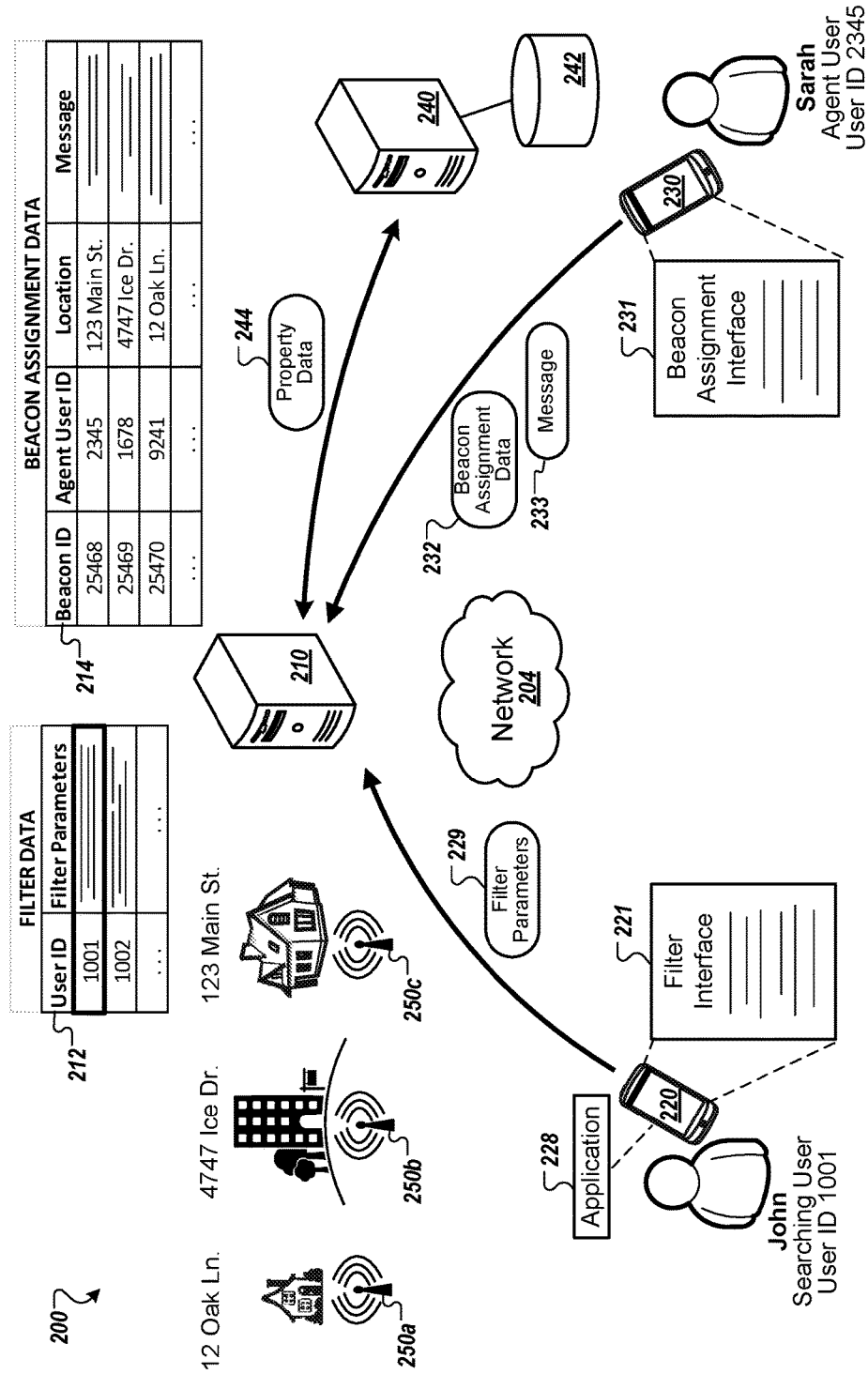
FIGS. 2A and 3A are diagrams that illustrate examples of a system for peer-to-peer location-based messaging.

FIG. 2A is a diagram that illustrates an example of a system 200 for peer-to-peer location-based messaging. The system 200 includes a server system 210, a user device 220 for a searching user, a user device 230 for an agent user, and a third-party server system 240, which has an associated database 242. These devices all communicate over a communication network 204, which can represent one or more public or private networks and can include the Internet. The system 200 also includes beacons 250a-250c, each of which can be a wireless transmitter that periodically transmits an identifier that distinguishes it from other beacons.

In the example of FIG. 2A, the various components of the system 200 exchange data so that the server system 210 can provide appropriate messages when the beacons 250a-250c are detected. In addition, the server system 210 obtains personalized filter criteria from the user device 220, so that the server system 210 can improve efficiency and customize the experience of the searching user.

The user devices 220, 230 can each be any appropriate computing device, such as a smartphone, a tablet computer, a smart watch, a laptop computer, a GPS navigation system, etc.

The agent user, "Sarah," can represent a real estate agent, property manager, property owner, or other user that would like to inform others about a property. The agent user can purchase or lease a beacon, and then place the beacon at a desired location. In the example, the agent user places the beacon 250c at a house having an address of 123 Main St. In order to be located at that location, the beacon 250c may be placed in any of a variety of ways, for example, placed on or in the house, or placed near the house, such as in a yard, on a mailbox for the property, etc.

The beacon 250c can be a battery-powered radiofrequency wireless transmitter. For example, the beacon 250c can be configured to transmit a simple wireless message at an interval, for example, three times per second, every second, every 5 seconds, etc. The beacon 250c may transmit its messages over Bluetooth, Wi-Fi, or any other appropriate wireless protocol. The message may be transmitted over a short-range connection with a limited power output, so that the message is detectible within a particular level of proximity of the beacon 250c, e.g., within 100 feet, within 200 feet, etc.

In some implementations, the wireless message from the beacon 250c is a fixed message that is not customized by the agent user. The agent user may simply place the beacon 250c in a desired location without adjusting the operating parameters of the beacon 250c.

With the beacon 250c placed, the agent user accesses a beacon assignment interface 231 using the user device 230. The beacon assignment interface 231 provides an interface, such as an application programming interface (API) or a graphical user interface (GUI) of an application, web page, or web application, that allows a user to specify the location of the beacon 250c, associate the beacon 250c with the agent user, and set a message to be sent to other users when they are near the beacon 250. The agent user may specify the location of a beacon in any of various ways, such as placing a pin on a map to denote the property where the beacon is located, providing a street address for the property, providing a multiple listing service (MLS) identifier for the property, or obtaining a global positioning system (GPS) reading while the user device 230 is at the property. The location information for the property where the beacon 250c is located is sent to the server system 210 as beacon assignment data 232.

The agent user can also use the beacon assignment interface 231 to provide a message 233 to be displayed to users whose devices detect the beacon 250c. Generally, the beacon 250c itself is not modified as a result, and the beacon 250c does not wirelessly transmit this message 233. Rather, the server system 210 stores the message 233 and serves it to a device over the network 204 when the server system 210 determines that the device detected the beacon 250c. The message 233 can include text, audio data, video data, image data, animations, 3D renderings, virtual tours, or other content to be presented. The agent user may provide other information for the message, such as a custom description of the property and/or an indication of upcoming events regarding the property, such as a date and time for an open house.

The server system 210 stores the message 233 and the beacon assignment data 232 in a data repository 214, which associates the information about the property at "123 Main St." with the beacon identifier for the beacon 250c and a user identifier for the agent user. The server system 210 also stores property data that describes characteristics of the property, e.g., amount of interior space, lot size, number of bedrooms and bathrooms, age, whether for sale or for rent, and other information. The server system 210 can request and receive property data 244 from another server system 240, such as an MLS server, which in turn accesses property data for MLS-listed properties from its own database 242. In addition, or as an alternative, the agent user can provide property data for a property through the beacon assignment interface. The property data is associated with the location data and message data in the data repository 214.

FIG. 2A also shows a searching user, "John," who has a user device 220. The user device 220 has an application 228 installed that processes beacon messages and communicates with the server system 210 to obtain and present messages to the user. Along with other functions, the application 228 provides a user interface that allows the user to specify the types of properties the user is interested in learning about. The application 228 provides a filter interface 221 that allows the user to set filter parameters 229 that represent user-specific criteria to limit the types of properties that the user will be notified of. Once the user enters filter parameters 229 using the filter interface 221, the filter parameters 229 are stored locally at the user device 220 and are used to adjust how the user is notified about properties when the beacons 250a-250c are detected.

The application 228 also causes the user device 220 to send the filter parameters 229 to the server system 210. The server system stores the filter parameters 229 for all users in a repository of filter data 212, with each user's filter parameters 229 being associated with the user's user identifier. Each time a user changes the filter parameters 229 for the application 228, the updated filter parameters 229 are sent to the server system 210, so the server system 210 can maintain an up-to-date record of the filter parameters for each user at all times.

Figures 2B, 2C:
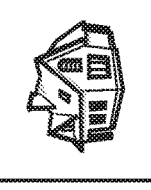

FIG. 2B is a diagram that illustrates an example of a filter interface 221 that a user can use to specify characteristics of properties that the user is interested in. The filter interface 221 includes a number of filter controls 223 that allow a user to specify aspects of properties that are desirable or undesirable. These controls 223 may be presented in any of various forms, such as text fields, buttons, sliders, dials, selectable icons or other elements, interactive maps, etc. A control 223 may allow a user to specify, for example, a specific value, a set of multiple values, or a range of values. Typically, filter controls 223 are used to specify property characteristics that are required for a message to be displayed, e.g., only properties having characteristics that match the specified parameters will have a message shown to the user. The characteristics for the property may describe the physical characteristics of the property (e.g., size, location, physical condition, etc.) or may describe other characteristics (e.g., year built, price, availability date, type of contract available, etc.).

In FIG. 2B, the filter interface 221 includes filter controls 223 that allow a user to specify a property type (e.g., residential, commercial, single family home, condominium, townhouse, empty lot, foreclosure, short sale, etc.), a contract type (e.g., for sale, for lease, rent to own, etc.), an amount of interior area (e.g., square feet of interior space), a number of bedrooms, a number of bathrooms, location, year built, parking capacity, number of days listed for sale or rent, a price range, and text keywords to match against a property's description. Filter controls 223 for other characteristics may be additionally or alternatively provided. Once a user has specified the filter parameters that are important to the user, the user can engage a save control 224 which saves the filter parameters and makes them active for the application 228, and also initiates sending the parameters to the server system 210 with the user identifier for the user.

FIG. 2C is a diagram that illustrates an example of a beacon assignment interface 231 that an agent user can use to assign a location to a beacon and set a message for presentation to users who are near the beacon. The beacon assignment interface 231 can provide information from the server system 210 indicating the beacons that are associated with the current user. In the example, the user Sarah has two beacons, and the user is assigning one of them to the property at street address "123 Main St." The user can enter the address in a text field to specify the current location of the beacon. In some implementations, agent users are free to re-locate beacons from one property to another as desired, and can simply use the beacon assignment interface to update the location after a beacon is moved.

The beacon assignment interface 231 also allows the user to create a customized message to users who are near the property. Message controls 234 can enable a user to upload an image or enter text for the message. The beacon assignment interface 231 also includes an import control 235 that the user can select to import information about characteristics of the property, which can be retrieved from an MLS database based on an MLS property identifier or a street address. Additional controls 236 can be used to enter characteristics of a property directly, and/or to specify which characteristics should be displayed as part of a message to a user.

Figure 3A:
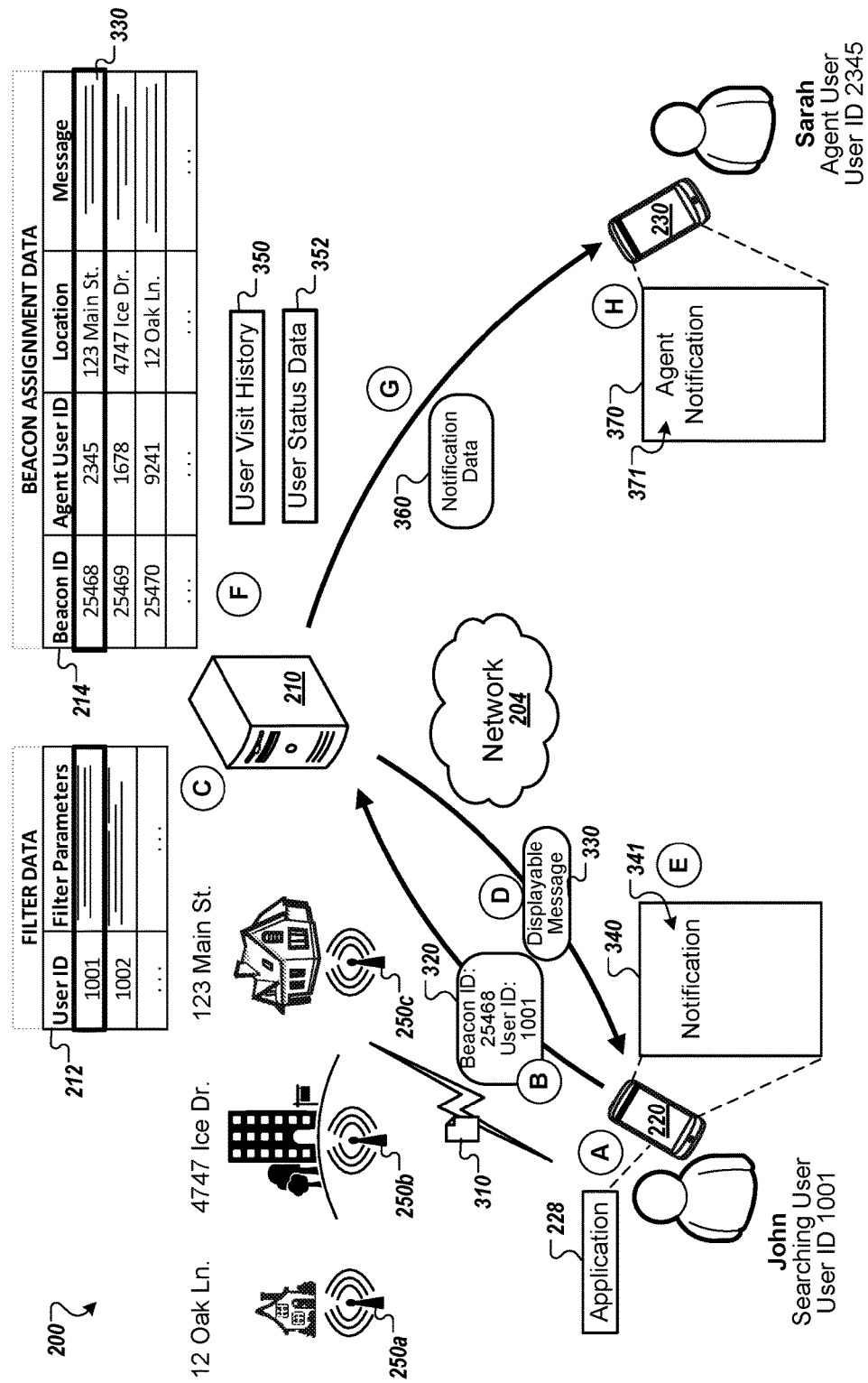

FIG. 3A is a diagram that further illustrates the system 200 for peer-to-peer location-based messaging. In this example, interactions between the beacon 250c, user device 220, server system 210, and user device 230 are illustrated to show how searching users and agent users can both receive communications in response to detection of beacons. FIG. 3A shows a series of stages labeled (A)-(H) which represent a flow of data as the system operates. Nevertheless, the operations of the system may occur in an order or arrangement different from what is illustrated.

In stage (A), the user device 220 receives a wireless message 310 from the beacon 250c. Generally, the wireless message 310 is received over a direct, short-range wireless link, usually without establishing an ongoing communication connection. Usually the beacon 250c is configured in a transmit-only configuration, and may not even include a receiver. As a result, the user device 220 does not need to respond to the beacon 250c or establish any connection with the beacon 250c.

The searching user, John, is traveling near 123 Main St. when his user device 220 enters level of proximity at which the message 310 is detected. For example, the user device 220 detects the message 310 sent using Bluetooth. The user device 220 also verifies that the signal strength is above a minimum threshold level that corresponds to a desired level of proximity for detection.

In some implementations, the message 310 includes a code or identifier for the application 228 that handles beacon messages. When the message 310 is received, the operating system of the user device 220 extracts the code, identifies the application 228 as the application to handle the message 310, and launches the application 228 and passes the contents of the message 310 to the application 228.

In stage (B), the application 228 processes the message 310 and sends a message 320 to the server system 210 over the network 204. The message 320 identifies the detected beacon 250c to the server system 210. The application 228 can extract, from the message 310, an identifier for the beacon 250c that sent the message 310. In the example, the beacon identifier is "25468," which uniquely distinguishes the beacon 250c from others in the system. When sending the message 320 to the server system 210, the application can specify a user identifier or other identifier (e.g., device identifier such as a phone number, etc.) to indicate which user or device detected the beacon 250c.

In some implementations, the user device 220 sends the message 320 quickly after receiving the message 310, e.g., within 10 seconds, within 5 seconds, within 1 second, etc. As a result, the resulting communication with the server system 210 and ultimately display of a notification can occur while the user device 220 is still in proximity to the beacon 250c and the corresponding property, 123 Main St. To save battery power and conserve communication bandwidth, the user device 220 may not send a message to the server system 210 each time the wireless message 310 is received from the beacon 250c. For example, the user device 220 may indicate the presence near the beacon 250c only once each minute, even if the message 310 is received each second. As another example, the user device 220 may send one message 320 to indicate that it is near the beacon 250c, and then after send another message to indicate that the user device 220 is no longer in proximity to the beacon 250c (e.g., after the user device 220 does not receive the message 310 for at least a minimum amount of time, such as 15 seconds). As another example, the user device may aggregate beacon identifiers from multiple beacon messages detected within a certain period of time, and periodically send a message indicating all beacon identifiers for received messages during that period. For example, every 10 seconds, the application 228 may send a message that includes the identifiers for all beacons detected during the previous 10 seconds.

In stage (C), the server system 210 receives the message 320 over the network 204 and processes the message 320. The server system 210 uses the user identifier to look up the user's filter parameters from the repository 212 of filter data. The server system 210 also uses the beacon identifier to look up the information associated with the beacon identifier (e.g., the location designated for the beacon identifier) indicated in the message 320 from the user device 220. The server system 210 can also keep a record of each user's current location with the user status data 352, to show the current beacon where a user is located. The location of a user is determined through the interaction of the server system 210 and the user device 220. The beacon 250c, which is typically a simple transmit-only device, does not determine and process location information, and the beacon 250c typically does not store or transmit any information specifying its location.

In some implementations, the server system 210 evaluates whether the property associated with the beacon satisfies the user's filter parameters retrieved from the repository 212. The server system 210 may send a message 330 to the user device 220 for display only if the characteristics of the property meet the user's requirements. In this manner, the server system 210 can avoid using excess bandwidth to transfer a message 330 if the message should not be shown according to the user's criteria. In other implementations, the server system 210 may retrieve and send the message 330 for a property regardless of the filter parameters, to allow the information to be stored (e.g., cached) at the user device 220. The server system 210 may thus leave the application 228 in control of applying the user filter parameters and determining whether to provide a real-time notification of the property. Even if the application 228 determines to not provide a notification immediately, the message and other information about the property may be accessed through the application 228, for example, in a history of all properties that a user visited. Similarly, if a user broadens the filter criteria so that the property would satisfy the new criteria, the information will be present at the user device 220 and can be included in a list of nearby properties at that time.

In stage (D), the server system 210 sends a displayable message 330 to the user device 220 over the network 204. The message 330 can describe the characteristics of the property, e.g., the location where the beacon 250c is located. The message 330 can be provided from information in the repository 214 of beacon assignment data, as well as information from a user visit history 350 and user status data 352.

The content of the message 330 can be in whole or in part from the content that the agent user provided when assigning the beacon to the property, e.g., "123 Main St." That is, in some instances, each user that detects the beacon may receive the same message 330 that the agent user specified, regardless of the user's visit history or filter parameters. However in other instances, the server system 210 may supplement, alter, or replace the message specified by the agent user with other information. For example, the server system 210 may include information about events relating to the property (e.g., open houses, upcoming showings, etc.), status changes for the property (e.g., price reduced, sale pending, etc.), or information about popularity of the property (e.g., an indication of how many other users have visited the property recently), even if this was not specified by the agent user. Similarly, the server system 210 may tailor the message 330 to the specific criteria that matter to the searching user, as reflected in the searching user's filter parameters. For example, the server system 210 may compose or revise the message 330 to show the characteristics that match the user's filter criteria, or to make those characteristics more prominent in the message 330. If the user is a repeat visitor, the server system 210 may change some of the content of the message 330 to provide the user new information from the repository 214 that was not presented on prior visits.

In some implementations, the server system 210 sends metadata indicating characteristics of the property with the displayable message 330. With this metadata, characteristics that are not explicitly stated in the message 330 can still be evaluated by the application 228 to determine whether the property meets the currently applicable filter parameters for a user.

In stage (E), the user device 220 receives the displayable message 330 over the network 204 and presents the content of the displayable message 330. The application 228 can first compare the property characteristics indicated by the server system 210 with the filter parameters that the user set. For example, the application 228 may extract metadata from the message 330, and compare the values for various characteristics with the current filter parameters of the user. Similarly, the application may extract values from the displayable information, e.g., from certain fields in a displayable message, or from a text description, and compare those values with the filter parameters. If all the filter parameters are satisfied, the application 228 causes the user device 220 to present the displayable message 330. This message 330 may be provided in any of various forms, for example, as a notification on a home screen or lock screen of a the user device 220, through an operating system's notification interface, or by bringing a user interface of the application 228 to the forefront for display. If the user device 220 is in a sleep mode or other low-power state, the operating system and the application 228 may wake the user device 220 to activate the display and notify the user, e.g., with a sound, vibration, etc. In some implementations, the message 330 may be additionally or alternatively sent via text message, e-mail, social media, or another messaging platform. The displayable message 330 may include text, images, video, audio, or other content. The displayable message 330 can be presented while the user device 220 is still in geographic proximity to the beacon 250c to detect the wireless messages 310 sent by the beacon 250c, e.g., while the user is still present at the property.

If the characteristics of the property corresponding to the message 330 do not satisfy the filter parameters that the user has set, the application 228 does not present the message 330. Processing of the wireless message 310 and evaluation of the message 330 can be done by the application 228 in the background, without signaling to the user that a beacon has been received. For example, if the user device 220 is in a sleep mode or locked mode when the wireless message 310 is detected, it may remain in that mode without change due to the processing of the received message 330 from the server system 210. Similarly, if another application or interface is shown, the detection, processing, and decision to not display the message 330 may be imperceptible to the user.

In some implementations, the server system 210 may provide other displayable messages to a searching user after detection of a beacon 250c. The other displayable messages may be dynamically generated based on the time that the user is at that property and the user visit history of the user. Similarly, the server system 210 may select and provide third-party messages selected from a set. For example, messages can be provided for from bankers, title agents, insurance companies, or other agents having properties similar to the one the user is visiting.

In some cases, detection of a beacon and the message 320 to the server system 210 may trigger presentation of other messages that are not specifically related to the beacon 250c that was detected. For example, the server system 210 may use artificial intelligence, machine learning, or other techniques to determine messages to send to a user. For example, based on popularity of certain properties in a geographic area, those properties may be suggested to the user. Similarly, the server system 210 may evaluate which properties receive repeat visits and the filter criteria of the users making the visits. Then, from a particular user's filter parameters, the server system 210 may predict which properties are most likely to be of interest to that particular user. In this manner, the server system 210 can customize the type, content, and frequency of messages to each user based on the user's specified filter parameters, visit history, and the visit history of other users, especially those with similar filter parameters or visit histories.

In some implementations, the application 228 may have a discovery mode in which detected beacons may result in presentation of a corresponding message on the user device 220. The application 228 may have one or more other modes that do not result in presentation of messages, even if the properties satisfy the filter criteria. By switching the two modes of the application 228 the user can enable discovery and real-time notification of properties meeting the user's filter parameters for certain times when the user wants to find new properties, but the user can set the application 228 to not provide these real-time notifications at other times.

In stage (F), the server system 210 analyzes user visit data 350 and user status data 352 to generate notification data 360 for the agent user of the property that the searching user is visiting. The server system 210 uses the beacon identifier for the beacon 250c, which was received from the user device 220, to look up the agent user associated with the beacon 250c. In addition to sending the displayable message 330 to the searching user, the server system 210 generates a different message for the agent user of the property being visited, to inform the agent user of the other user's presence and likely interest in the property. By notifying the agent user when users arrive, the server system 210 enables the agent user to better track the traffic to properties and initiate communication with users while they are at the properties.

The server system 210 can provide other information beyond simply notifying the agent user of the presence of another user. In some implementations, an agent user is notified when any user of the application 228 is within proximity of the beacon 250c. In other implementations, the server system 210 only notifies the agent user when a visiting user's filter parameters are satisfied by the property where the beacon 250c is located. In addition to this information about current presence of a user, the server system 210 may indicate whether the user has visited the property before. This can be determined from the user visit history 350 which can store a log of beacon detections of the various devices over time. The information can indicate the times, dates, and durations of the prior visits to the property by the user, and a summary of that information can be provided to the agent user. Information about a number of other users currently present at the property, logs or trends of visits in a particular time period (e.g., the last week, month, or year), an indication of other properties associated with the agent user that also satisfy the searching user's filter criteria can also be provided.

In some implementations, to preserve privacy, personal information of a searching user may not be automatically transferred to the agent user. For example, although the notification data may include a control enabling communication with the user, the name of the user and contact information may be hidden until the user decides to accept communication with the agent user or to share the user's information.

In some implementations, the server system 210 may indicate one or more of the filter parameters of a user visiting a beacon to the agent user. For example, in a notification about the presence of the user at one property may also indicate an overall geographic range that satisfies the filter parameters of the user. With this or other filter parameter information, an agent user may more accurately identify other properties that may be of interest to the user. As an alternative, to limit the amount of information shared, specific filter parameters may not be automatically provided to agent users. In addition, the identity of the searching user who is present may not be indicated to the agent user, unless the searching user authorizes the information to be shared. As a result, the notification data sent to the agent user may signify that some user is present at a property and the property satisfies the user's filter criteria, the identity of the user and the user's filter parameters may be kept confidential.

In stage (F), the server system 210 sends the notification data 360, which indicates the presence of the user at the property, to the user device 230 of the agent user over the network 204.

In stage (G), the user device 230 receives the notification data 360 and displays it in a notification 371 on a user interface 370. The notification data 360 can be received and displayed in real-time, e.g., while the searching user is still within geographic proximity to detect the wireless messages 310 from the beacon 250c. One of the benefits of this real-time messaging is that the notification 371 can provide controls for initiating communication with the searching user who is present at the property. This can allow the agent user to provide additional information, answer questions, arrange for a showing of the property, and otherwise connect with the searching user at a time when the communication is most relevant.

As discussed above, the notification data 360 that is provided can provide various types of information, such as the number of users currently near the property, the number of users present whose filter parameters are satisfied by the property, information about how frequently the user has previously visited the property or other properties, and so on. The notification data 360 may be provided through any of multiple communication channels, e.g., on user interface of an application, a user interface of a web page or web application, an e-mail, a text message, and so on.

FIG. 3B is a diagram that illustrates an example of a user interface 340 and a notification 341 provided on the user device 220 in response to the user device 220 detecting the beacon 250c. The notification 341 provides property information 342 that can describe characteristics of the property where the beacon 250c is located. Media, such as audio, video, images, icons, animations, virtual reality tours, or other content, can be provided in the notification 341 to show or describe the property. An agent user can specify this media, along with text to be presented to a user. As discussed above, the notification 341 may provide a predetermined, user-generated message from the agent user. Alternatively, the notification 341 may provide a dynamically-generated message composed by the server system 210 in response to the detection of the beacon 250c. For example, the server system 210 may use the user's history of recent beacons detected, the user's filter parameters, the current status of the property, histories of visits by other users to the property or other properties, and other information to generate a message to be displayed. For example, the server system 210 may include in the notification 341 a comparison between the property and another property or group of properties, e.g., properties that the user visited recently, or properties that the user marked as favorites.

Messages provided by the server system 210 for display in a notification 341 may relate to different properties than the one where the detected beacon 250c is located. For example, even if a user is near a beacon for a first property, the server system 210 may provide notification 341 with listing information for a second property, especially if the first property is not within the user's filter parameters and the second property is. In some cases, a user may provide filter parameters that are so strict that there are few or no matches. The server system 210 can generate messages that are helpful in this scenario, even if no pre-determined user-defined message is applicable.

Based on evaluating the available properties and the user's filter criteria, the server system 210 may identify properties that are close to the user's criteria, even if not precisely within the criteria. For example, the server system 210 can perform an iterative process to gradually relax filter parameters until a set of applicable properties reaches a minimum number. The server system 210 can broaden one filter parameter at a time to add additional properties to an applicable set. For example, if a user sets price, location, and size constraints, the server system 210 may expand the price range in increments to identify a few more properties of interest, then use the original price constraint while broadening the range of locations to identify others, then use original price and location while expanding the range of sizes allowed. Multiple parameters can be relaxed simultaneously to identify even further options. These and other techniques can be used to provide information to users who may have inadvertently set filter parameters too strict for the set of properties available.

In the example shown, the notification 341 also includes controls 343 that enable the user to perform various actions. For example, the controls 343 allow a user to save the property to a list, or designate it as a favorite. On the other hand, the user can select a control 343 to ignore or dismiss the notification 341. The notification 341 may allow different modes of dismissal, for example, (i) a swipe to ignore the current notification 341 but allow the notification to be provided if the user returns to the property, and (ii) a selectable button to permanently dismiss the notification 341 so that the user will not be notified about the property even if the user returns in the future. Another control 343 can allow the user to contact the agent user, e.g., by text message, phone call, video call, email, etc. Other controls 343 may allow the user to initiate display of additional information about the property, such as a full property listing, or more information about the agent user that is associated with the beacon 250c. Another control 343 may enable the user to share the notification 341 to another user, post the notification 341 on a social network, or send information about the property to another application.

FIG. 3C is a diagram that illustrates an example of a user interface 370 and a notification 371 provided on the user device 230 of the agent user in response to the user device 220 detecting the beacon 250c. The notification 371 includes an indication 372 that a user has arrived at a particular property, e.g., 123 Main St., where the beacon 250c is located. In some implementations, the fact that a notification is provided indicates that the property satisfies the filter parameters of the arriving user. The notification 371 may also provide information about the level of interest of the user, such as a number of prior visits, a duration of prior visits, a date of a last visit, etc. This information, obtained from the user visit histories 350 that track beacons detected by each user of the system 200, can be very helpful in allowing the agent user to determine how and whether to communicate with the user. The notification 371 can include one or more controls 373 for initiating communication with the user, e.g., by text message, e-mail, phone call, video call, etc. The notification 371 can include other information about the property, such as a time and date of an event, such as an open house. One or more controls 374 can enable the agent user to invite the user from the notification interface.

The user interface 370 can provide other information about the agent user's properties, either as part of the notification 371, a web page, a web application, a native application, or other interface. For example, status information 375 can provide information about recent visits by other users over a period of time, e.g., 1 day, 1 week, 1 month, etc. The information may be arranged in any appropriate manner, for example, showing total visits by users, total unique users visiting over the period, number of users who made repeat visits, etc. This information may be provided for each of the properties associated with the agent user, with each of the properties having a separate beacon.

The user interface 370 can provide additional information 376, such as recommendations or suggestions for improving the message or listing information of a specific property. For example, the example of FIG. 3C shows that a total of 465 users of the system 200 have filter parameters set which would include the 123 Main St. property. The information 376 also indicates that a change in price by 5% would allow the property to satisfy the filter criteria of another 232 users.

Other suggestions can be provided to help an agent user improve the effectiveness of messaging for the property.

Figure 4:
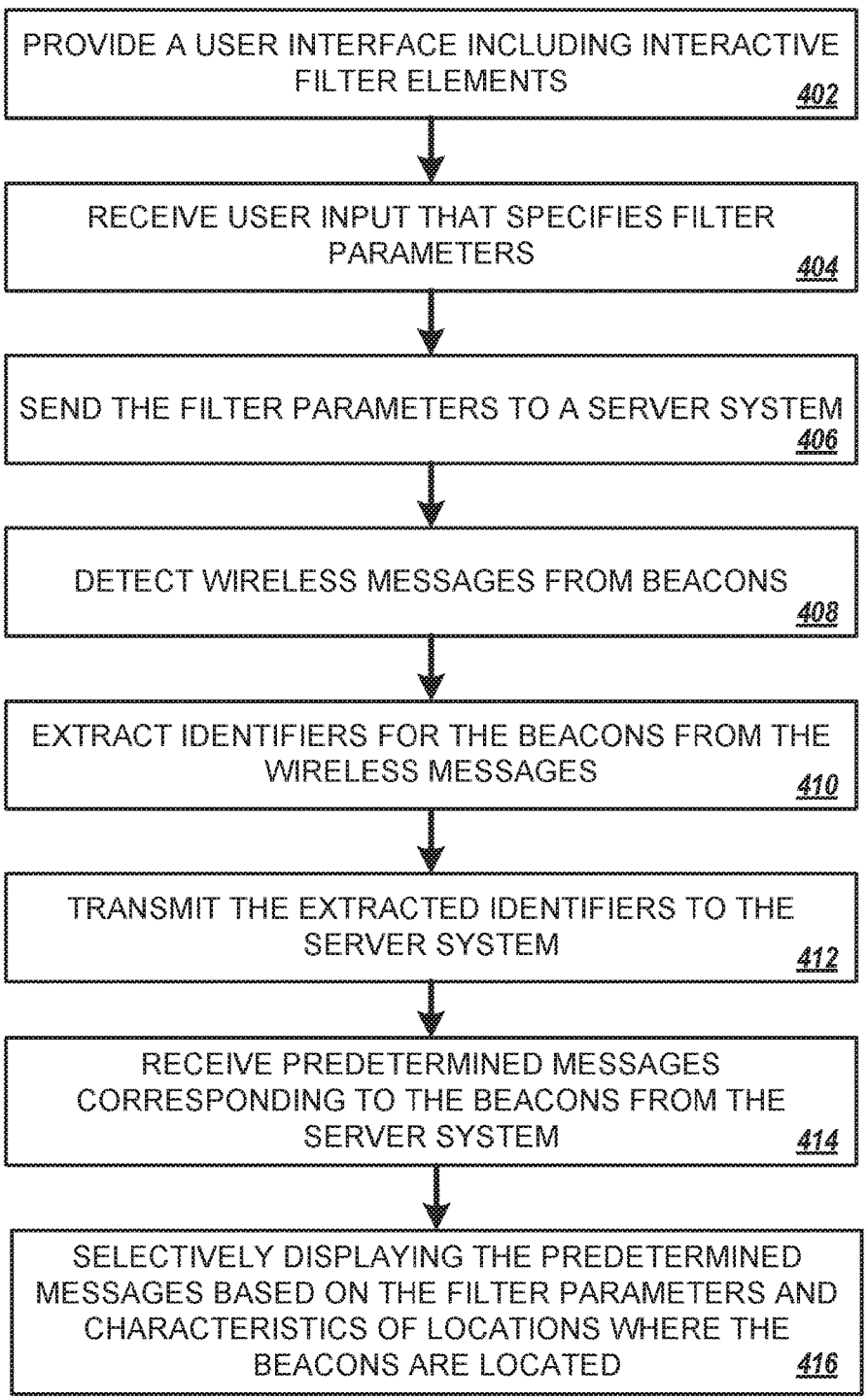
FIGS. 4 and 5 are flow diagrams that illustrate processes for peer-to-peer location-based messaging.

FIG. 4 is a flow diagram that illustrates a process 400 for peer-to-peer location-based messaging. The process 400 can be performed by a mobile device, such as a cellular phone, smartphone, tablet computer, and so on. For example, the process 400 can be performed by a mobile device 120 or 220 as discussed above. Although the process 400 is described as being performed by a mobile device, the process 400 can similarly be performed by any appropriate computing device or combination of multiple devices.

The mobile device provides a user interface that includes interactive filter elements (402). The user interface can be an interface of an application running on the mobile device, an interface of a web page or web application, or other interface. The interactive filter elements are configured to receive user input specifying characteristics of properties. The interactive elements can be buttons, drop-down lists, text fields, check boxes, radio buttons, dials, sliders, a map with selectable areas, or other interactive controls. The filter criteria that can be specified with the interactive filter elements can include, for example, a property type (e.g., commercial property vs. residential property, a single family home, a condominium, a townhome, land, or some combination of multiple types), a contract type (e.g., whether a property is for sale or for lease), an amount of interior area (e.g., number of square feet), an amount of land included in the property, a number of bedrooms, a number of bathrooms, a geographical area, a year a structure is built, whether parking is available, an amount of time a property has been listed, a price for the property, keywords in description of a property, and/or other criteria.

The mobile device receives user input that specifies filter parameters for one or more of the interactive filter elements (404). The user input can indicate values or ranges of values that are acceptable for different characteristics. For example, the user input can specify a geographic area of interest, such as one or more states, counties, cities, or zip codes. As another example, the user input can indicate characteristics of a property, such as age, size, numbers of different types of rooms, and so on. Some of the input may specify physical characteristics or features of properties. The user may set values, combinations of values, or ranges for any of the various filter criteria discussed above. The mobile device stores the filter parameter and can apply them to determine whether to notify a user about properties corresponding to detected beacons.

The mobile device sends the filter parameters to a server system (406). The filter parameters are sent in association with user identification data that identifies a user of the mobile device. The user identification data, such a user name, a device identifier, network session identifier, etc., allows the server system to associate the filter parameters with a particular user account or device. In some implementations, it allows the server system to pre-filter messages before sending them to the mobile device. This can reduce consumption of network bandwidth, computing resources, and battery power of the mobile device, since the server system performs the analysis of each message and does not transfer messages for properties that do not satisfy the filter criteria for the user.

The mobile device detects beacons by receiving a wireless message from each beacon (408). The wireless messages can be received over a wireless radio interface, such as Bluetooth. The mobile device may receive and process wireless messages one by one, as it receives them. Each of the wireless messages can include an identifier for the beacon that transmitted the wireless message. Each of the beacons corresponds to a different property, and beacons can be located at the corresponding property registered for the beacon. As discussed above, the wireless message generally does not include any content to be displayed by the mobile device and does not immediately trigger any notification on the mobile device.

In some implementations, the mobile device applies various criteria to detected messages to determine whether to act on a received wireless message. For example, the mobile device can determine a signal strength at which a particular message is received, and determine whether the signal strength satisfies a threshold. The threshold may correspond generally to a detection distance, e.g., 200 feet, 100 ft, 50 ft, or some other distance, and the threshold may be varied to register beacon detection at different levels of proximity. If the signal strength is higher than the minimum threshold, the mobile device can designate the particular beacon as detected. The mobile device may ignore very weak wireless messages until signal strength, and thus proximity to the beacon, increases to above the threshold level.

The mobile device extracts the identifiers for the beacons from the wireless messages (410). The mobile device then sends the extracted identifiers for the beacons to the server system (412). The mobile device may send a beacon identifier immediately after receiving the wireless beacon message. As the mobile device remains in a proximity of the beacon, it will continue to receive wireless messages from the beacon that indicate the same beacon identifier.

After initially informing the server system that the mobile device is near a beacon, the mobile device may periodically send messages to the server system indicating that the mobile device is still near the beacon, e.g., every 10 seconds or every minute, rather than sending the identifier to the server system for each repeated transmission of the wireless message that the mobile device detects. As an alternative, to reduce network bandwidth consumption and power consumption, the mobile device may send one message to the server system that indicates detection of the beacon, and then send a second message to the server system after the beacon has no longer been detected for at least a minimum amount of time. For example, if the mobile device determines that the beacon has not been detected within 10 seconds, the mobile device can infer that it is no longer near the beacon and can inform the server system. The mobile device may maintain records of the beacon identifiers most recently received, and compare identifiers from newly received wireless beacon messages to determine whether to inform the server system.

The mobile device receives displayable messages from the server system for the detected beacons (414). The mobile device can receive a different message for each beacon detected. Typically, each beacon is associated with a single property and has a single displayable message associated with it at any given time. The displayable message associated with a beacon can describe the features of a property, e.g., in text and other content provided for display and/or in metadata accompanying a displayable message. The same single displayable message for a beacon can be provided by the server system to all users that detect the beacon. The displayable message for a beacon is often a user-specified message that another user of the system has designated to be presented when the beacon is detected. For example, a user, such as a real estate agent, that places a beacon at a property can specify the message to be displayed when that beacon is detected.

In some implementations, the mobile device receives a displayable message from the server for each beacon that is detected. The mobile device then can evaluate the received message and any associated data about the corresponding property to determine whether the user's filter parameters have been satisfied. In some implementations, the mobile device receives a displayable message for each of only a subset of the beacons detected. Because the mobile device provides filter parameters to the server system, the server system may apply those filter parameters to send only displayable messages for properties that satisfy the filter parameters. The pre-filtered messages can exclude displayable messages for beacons that were detected by the mobile device but have corresponding displayable messages that do not describe characteristics that satisfy the filter parameters.

The mobile device selectively displays messages corresponding to detected beacons (416). For example, the mobile device may apply the filter parameters specified by the user to limit notifications presented to only notifications for properties that meet the user's filter parameters. Messages that describe properties that do not meet the filter parameters are not provided. The mobile device can display the displayable message for a property while the mobile device is in a detection range to receive the wireless message from the beacon corresponding to the property. For example, the interactions between the mobile device and the server system to obtain and present the displayable message for a beacon may occur within a few seconds of the mobile device detecting the beacon, so that the message is presented while the user is still at the property where the beacon is located.

In some implementations, the mobile device may receive messages from the server system for a property where the mobile device is not currently located. The server system may use a user's filter parameters and history of beacon detection to determine other messages to provide to a user. For example, the mobile device may receive messages about events, such as scheduled open houses, for properties in a geographical area matching the user's filter parameters. Once a mobile device has visited a property that matches the filter parameters, the mobile device may receive and display messages regarding the property. As an example, a status change for the property, such as a change in price, a new offer or contract, etc., can be indicated in a message provided from the server system and displayed to a user. Similarly, the mobile device may receive messages that describe recommended properties that satisfy the user's filter parameters, even if the user has not previously or does not currently detect a beacon for the property.

Figure 5:
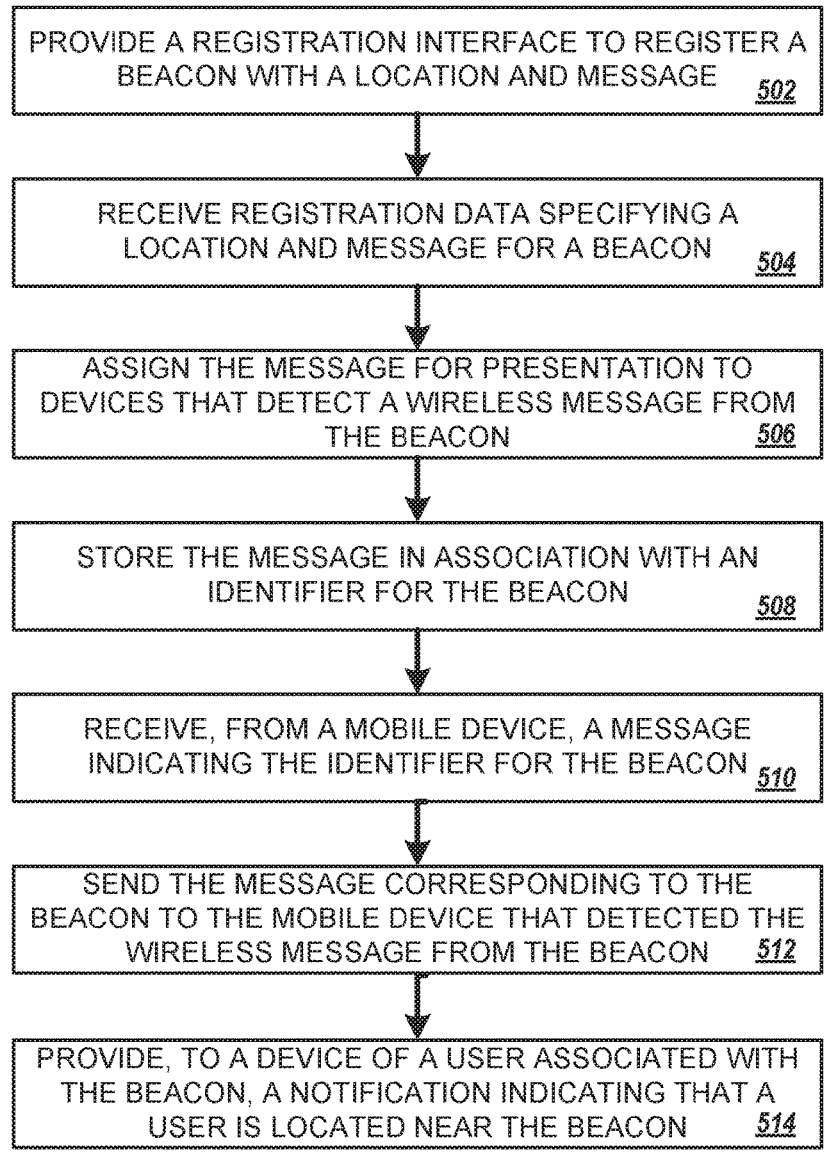

FIG. 5 is a flow diagram that illustrates a process 500 for peer-to-peer location-based messaging. The process 500 can be performed by one or more computers, such as the server system 140 or 210 discussed above. Although the process 500 is described below as being performed by a server system, the process 500 can similarly be performed by any appropriate computing device or combination of multiple devices.

A server system provides a registration interface for registering a beacon with a location and a message (502). Through the registration interface, users can associate each individual beacon (out of perhaps hundreds or thousands of beacons) with a corresponding property and message to be provided upon detection of the beacon. The locations and the messages can be designated by users of the system. For example, a user may specify a property by a street address, global positioning system (GPS) coordinates, or a multiple listing service (MLS) identifier. A user may specify a message by entering text, uploading media (e.g., images, video, virtual tours, etc.), or importing content (e.g., from an MLS database, web page, or other data source).

The registration interface may be provided in any of various forms. For example, the server system may serve a web page or web application that includes a user interface that can be displayed by a computing device of a user. As another example, the registration interface can be an application programming interface (API) supported by the server system, which enables an application to transmit data to the server system for registration. One of the advantages of the registration interface is that it allows users to change the messages displayed when a mobile device detects a beacon remotely and in real time. No changes are made to the wireless message transmitted by the beacon, and neither the server system nor the device of the user needs to communicate with the beacon for the change in the message to take effect.

The server system receives registration data provided through the registration interface (504). The server system can first authenticate a user, for example, by requiring the user to log into a user account. Once logged in, the user can be shown a list of beacons that have been purchased or leased by the user. A real estate agent may manage many different beacons, and may change the location of the beacons and the corresponding messages from time to time.

The message for a beacon may describe the characteristics of the property registered for the beacon, e.g., the property where the user places the beacon. This descriptive information may be included in text to be displayed to a user upon detecting the beacon, whether in free-form text or in specific text fields describing different aspects of the property. Screen space is often limited on mobile devices, which will be displaying the messages describing the property, and so some or all of the descriptive content may be omitted from an initial notification message to be displayed to a user. Nevertheless, the information may be displayed in response to a user action, such as tapping or swiping for the notification of a property. In addition, or as an alternative, metadata describing the characteristics of the property can be included in the message. Although not displayed in a notification, the metadata describing the property can be useful for comparison with a user's personalized filter parameters to determine whether a particular message should be displayed or not.

The server system assigns a message indicated by the registration data for presentation to devices that detect a wireless message from the beacon (506). From that point forward, when mobile devices indicate to the server system that they detected the beacon, the server system will send the new user-specified message.

The server system stores the message in association with an identifier for the beacon (508). The server system stores the user-specified message for the beacon and the user-specified location of the beacon in association with the beacon identifier. When a mobile device provides the identifier for the beacon, to indicate that the beacon was detected, the server system can efficiently look up the displayable message that has been stored in association with the beacon identifier. The beacon identifier is also associated in database records or through other means with an identifier of the agent user that is associated with the beacon, allowing the server system to efficiently identify and communicate with the agent user that manages the beacon when other users arrive.

The server system receives a message from a mobile device, where the message indicates the identifier for the beacon (510). For example, the server system receives a message from the mobile device that includes the beacon identifier for a beacon, which the mobile device extracted from a short-range wireless message from the beacon.

The server system sends the message corresponding to the beacon to the mobile device that detected the wireless message from the beacon (512). The server system can use the identifier that the mobile device provided to look up a predetermined, user-specified message that is stored for the beacon. The server system then provides the stored message to the user over a communication network. In some implementations, the server system may generate a new message, or may supplement or alter a message that a user designated to be provided to others. In general, the server system provides the message to the mobile device for display while the mobile device is still in a geographic range to receive the wireless message transmitted by the particular beacon. In some implementations, the server system may send the message quickly, for example, within 10 seconds or less of receiving the message indicating detection of the beacon, so the message can be displayed by the mobile device before the user leaves proximity of the beacon.

In some implementations, the server system provides the message for the beacon only if the property associated with the beacon satisfies the filter parameters set by the user of the mobile device. For example, the message from the mobile device which provides the beacon identifier can also indicate a user identifier. The server system can use the user identifier to look up stored filter parameters that the user has set. The server system compares the stored filter parameters for the user with the characteristics indicated by the stored message for the beacon, and provides the stored message only if the characteristics satisfy the filter settings.

The server system provides, to a device of a user associated with the beacon, a notification indicating that a user is located near the beacon (514). The detection of a beacon by a mobile device can trigger a message from the server system to the agent user that manages the beacon, and not only a message to be displayed at the mobile device that detected the beacon. For example, when a mobile device detects a beacon and the characteristics of the property satisfy the user's filter requirements, the agent associated with the beacon can be notified of the arrival of the new user.

The server system can send a notification that informs the agent of the nature of the visit, such as whether the visiting user has visited previously and how many times, the duration of the current visit, whether the user is in the building or is simply nearby (e.g., as estimated from the signal strength of beacon message detection), and other information. The notification to the agent may also provide a control for initiating communication with the visiting user, for example, to send a text message or start a phone call. In some implementations, the server system acts to preserve the privacy of the visiting user or apply preferences of the visiting user. For example, the server system may inform the agent that a user is visiting the property and allow a message to be sent, but withhold the identity of the visiting user from the agent unless the visiting user agrees to share that information. Similarly, the server system may indicate that a user's filter criteria are satisfied by an agent's property, but may withhold the actual filter parameters used so that the specific values or ranges of interest to the user are not indicated to the agent.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by a mobile device, the method comprising:
    providing, by the mobile device, a user interface of an application, the user interface comprising interactive filter elements configured to receive user input specifying physical characteristics of real estate properties, the physical characteristics comprising one or more of a size, an amount of interior space, or a number of rooms;
    receiving, by the mobile device, user input that specifies filter parameters for one or more of the interactive filter elements, the user input specifying a value or range of values for at least one of the physical characteristics of real estate properties;
    sending, by the mobile device, the filter parameters to a server system in association with user identification data that identifies a user of the mobile device, the filter parameters indicating the specified value or range of values for the at least one of the physical characteristics of the real estate properties;
    detecting, by the mobile device, a plurality of beacons by receiving a wireless message from each of the beacons, each of the wireless messages including an identifier for the beacon that transmitted the wireless message, each of the beacons corresponding to a different real estate property and being located at the corresponding real estate property;
    extracting, by the mobile device, the identifiers for the beacons from the wireless messages;
    transmitting, by the mobile device, the extracted identifiers for the beacons to the server system;
    receiving, by the mobile device, displayable messages from the server system for at least some of the extracted identifiers; and
    selectively displaying, by the mobile device, displayable messages associated with the extracted identifiers based on the filter parameters and data indicating characteristics of the real estate properties where the beacons are located, wherein, for each of the displayable messages, the mobile device displays the displayable message while the mobile device is in a detection range to receive the wireless message from the beacon corresponding to the displayable message.

2. The method of claim 1, further comprising, for each of the displayable messages, receiving the displayable message from the server system over a communications network in response to transmitting the extracted identifier for the beacon corresponding to the displayable message;
    wherein each of the displayable messages describes characteristics of the real estate property corresponding to the beacon.

3. The method of claim 1, wherein extracting the identifiers comprises extracting an identifier from the wireless message from each of the beacons in the plurality of beacons;
wherein transmitting the extracted identifiers comprises transmitting the extracted identifiers for each of the beacons in the plurality of beacons;
wherein selectively displaying the displayable messages comprises (i) displaying a displayable message for only a subset of the beacons detected by the mobile device, each of the beacons in the subset being associated with a displayable message describing characteristics that satisfy the one or more filter parameters, and (ii) not displaying a message for one or more beacons detected by the mobile device that are associated with a displayable message that describing characteristics that do not satisfy the one or more filter parameters.

4. The method of claim 3, further comprising:
receiving, by the mobile device and from the server system, a different displayable message for each of the beacons in the set of beacons, each of the different displayable messaged describing characteristics of the real estate property corresponding to the beacon; and
evaluating, by the mobile device, each of the different displayable messages to determine whether the displayable message describes characteristics that satisfy the filter parameters;
wherein selectively displaying the displayable messages comprises displaying only the displayable messages that the mobile device determined to describe characteristics that satisfy the filter parameters.

5. The method of claim 3, further comprising:
receiving, by the mobile device, pre-filtered messages from the server system, the pre-filtered messages including a different displayable message for each of the beacons in the subset, and the pre-filtered messages excluding displayable messages for beacons that were detected by the mobile device but have corresponding displayable messages that do not describe characteristics that satisfy the filter parameters.

6. The method of claim 1, wherein detecting, by the mobile device, a plurality of beacons by receiving a wireless message from each of the beacons comprises:
receiving the wireless messages over a Bluetooth wireless interface.

7. The method of claim 1, wherein detecting, by the mobile device, a plurality of beacons by receiving a wireless message from each of the beacons comprises:
determining a signal strength at which a particular message is received;
determining that the signal strength satisfies a threshold; and
designating the particular beacon as detected in response to determining that the signal strength satisfies the threshold.

8. The method of claim 1, further comprising:
receiving, from the server system, an additional message that identifies a real estate property corresponding to a beacon that the mobile device did not detect, the additional message being provided based on the filter parameters sent by the mobile device; and
displaying the additional message on a display of the mobile device.

9. A method performed by a server system, the method comprising:
providing, by the server system, a registration interface for registering individual beacons with a respective real estate property and a respective message to be provided upon detection of the beacon;
receiving, by the server system, registration data provided through the interface by a user associated with a particular beacon, the registration data specifying a real estate property corresponding to the particular beacon and a message corresponding to the particular beacon, wherein the message describes characteristics of the real estate property;
in response to receiving the registration data, assigning, by the server system, the message indicated by the registration data for presentation to mobile devices that detect a wireless message transmitted by the particular beacon;
storing, by the server system, the message in association with an identifier for the particular beacon;
receiving, by the server system and from a mobile device, (i) filter parameters that a user of the mobile device entered through a user interface of the mobile device, the filter parameters specifying a value or range of values for at least one physical characteristic of real estate properties, wherein the at least one physical characteristic is a size, an amount of interior space, or a number of rooms, and (ii) an identifier corresponding to the user or the mobile device;
storing, by the server system, the filter parameters in association with the received identifier corresponding to the user or the mobile device;
receiving, by the server system, a message from a mobile device, the message indicating the identifier for the particular beacon; and
in response to receiving the message indicating the identifier for the particular beacon, sending, by the server system and to the mobile device, the message corresponding to the particular beacon for display while the mobile device is in a geographic range to receive the wireless message transmitted by the particular beacon.

10. The method of claim 9,
wherein receiving the message indicating the identifier for the particular beacon comprises receiving the identifier for the particular beacon in association with the user identifier for the user of the mobile device;
wherein the method further comprises, in response to receiving the message from the mobile device, determining that characteristics of the real estate property associated with the particular beacon satisfy the filter parameters for the user of the mobile device; and
wherein sending the message corresponding to the particular beacon is performed based on determining that characteristics of the real estate property associated with the particular beacon satisfy the filter parameters for the user of the mobile device.

11. The method of claim 9, further comprising:
receiving, by the server system, sets of filter parameters from each of multiple different mobile devices;
storing, by the server system, the sets of filter parameters in association with user identifiers for users of the multiple different mobile devices;
receiving, by the server system, data for each of the multiple different mobile devices indicating identifiers of beacons detected by the mobile device;
identifying, by the server system, one or more real estate properties corresponding to wireless beacons associated with a particular agent user;
identifying, by the server system, users whose filter parameters are satisfied by at least one of the one or more real estate properties and who are currently located in a geographic area that includes the one or more real estate properties; and providing, by the server system and to an electronic device associated with the particular agent user, information that describes the identified users.

12. The method of claim 11, wherein providing the information to the agent user comprises:

indicating a count of the identified users;

indicating a count of the identified users whose filter parameters are satisfied by a particular one of the one or more real estate properties;

indicating a specific user of the identified users who is currently located at a particular real estate property of the one or more real estate properties and whose filter parameters are satisfied by the particular real estate property;

providing an indication of filter parameters of one or more of the identified users or an aggregate measure of filter parameters for multiple of the identified users; or indicating, for one or more of the identified users, a number of visits to at least one of the one or more real estate properties or a duration of visits to at least one of the one or more real estate properties.

13. The method of claim 11, further comprising:

providing, to the electronic device associated with the particular agent user, data causing the electronic device to provide a user interface enabling the particular agent user to initiate communication with one or more of the identified users;

receiving, from the electronic device, user interaction data indicating interaction with the user interface; and in response to the interaction data, initiating communication between the particular agent user and one or more of the identified users.

14. The method of claim 9, further comprising:

in response to receiving the message from the mobile device indicating the identifier for the particular beacon, determining that the filter parameters for a first user associated with the mobile device are satisfied by the characteristics of the real estate property corresponding to the particular beacon;

identifying an agent user associated with the particular beacon; and providing a notification to an electronic device of the identified agent user while the mobile device of the first user is located to detect the wireless message from the particular beacon.

15. The method of claim 9, further comprising:

in response to receiving the message from the mobile device indicating the identifier for the particular beacon:

accessing data indicating previous visits to real estate properties by the user of the mobile device, the previous visits being determined based on detection of identifiers for beacons corresponding to the real estate properties; and providing data describing the previous visits to an agent user associated with the particular beacon.

16. The method of claim 9, further comprising:

receiving, by the server system, filter parameters from each of multiple different mobile devices;

storing, by the server system, the filter parameters in association with user identifiers for users of the multiple different mobile devices;

identifying an event scheduled to be held at a particular real estate property;

selecting a set of users to invite to the event based on the stored filter parameters; and providing, to each of the selected users, an invitation to the event.

17. The method of claim 9, further comprising identifying, based on data indicating beacon identifiers provided by mobile devices, users that have visited a particular real estate property within a particular period of time; and causing an invitation to an event to be provided to each of the identified users for which the particular real estate property satisfies the filter criteria for the user.

18. The method of claim 9, further comprising:

determining an identifier for the real estate property corresponding to the particular beacon; and using the determined identifier to obtain, from a third-party server, data describing characteristics of the real estate property corresponding to the particular beacon;

wherein sending the message corresponding to the particular beacon comprises sending a message indicating one or more of the characteristics of the real estate property indicated by the obtained data.

* * * * *